United States Patent [19]

Bell et al.

[11] 3,943,077

[45] Mar. 9, 1976

[54] FIRE RETARDANT POLYURETHANE FOAMS

[75] Inventors: Reuben H. Bell, Cincinnati; Russell M. Boardway, Jr., Granville; Francis D. Thomson, Newark, all of Ohio; Donald C. Wysocki, Pittsburgh, Pa.

[73] Assignee: Owens-Corning Fiberglas Corporation, Toledo, Ohio

[22] Filed: Jan. 6, 1975

[21] Appl. No.: 538,647

Related U.S. Application Data

[63] Continuation-in-part of Ser. No. 360,261, May 14, 1973, abandoned.

[52] U.S. Cl. ...... 260/2.5 AJ; 252/182; 260/2.5 AK; 260/2.5 AP; 260/2.5 AQ; 260/2.5 AR; 260/2.5 AV
[51] Int. Cl.$^2$............................................ C08J 9/14
[58] Field of Search .... 260/2.5 AP, 2.5 AV, 2.5 AJ, 260/2.5 AK, 2.5 AQ, 2.5 AR; 252/182

[56] References Cited
UNITED STATES PATENTS

| | | | |
|---|---|---|---|
| 2,915,475 | 12/1959 | Bugosh | 260/2.5 |
| 3,252,775 | 5/1966 | Tocci-Guilbert | 260/2.5 |
| 3,441,523 | 4/1969 | Dwyer et al. | 260/2.5 |
| 3,501,421 | 3/1970 | Hindersinn et al. | 260/2.5 |
| 3,585,185 | 6/1971 | Levis, Jr. et al. | 260/2.5 |
| 3,632,531 | 1/1972 | Rush et al. | 260/2.5 |
| 3,640,920 | 2/1972 | Cear | 260/2.5 |
| 3,676,376 | 7/1972 | Svoboda et al. | 260/2.5 |
| 3,682,845 | 8/1972 | Longley et al. | 260/2.5 |
| 3,706,680 | 12/1972 | Booth | 260/2.5 |
| 3,737,400 | 6/1973 | Kumasaka et al. | 260/2.5 |
| 3,770,671 | 11/1973 | McFarling | 260/2.5 |

*Primary Examiner*—Eugene C. Rzucidlo
*Attorney, Agent, or Firm*—John W. Overman; Patrick P. Pacella

[57] ABSTRACT

Flame retardant polyurethane foams are disclosed. Flame resistance is achieved by a combination of at least three polyols. Control of internal exotherm is achieved by the addition to the foams of an inorganic material such as hydrated alumina.

7 Claims, No Drawings

FIRE RETARDANT POLYURETHANE FOAMS

This is a continuation-in-part patent application of U.S. patent application Ser. No. 360,261, filed May 14, 1973, now abandoned.

This invention relates to flame-retardant polyurethane foams.

Polyurethane foams have found widespread utility in the fields of insulation and structural reinforcement. One factor limiting the commercial utilization of polyurethane foams has been their flammability when exposed to flame or high temperature. Various additives are known in the art for producing flame resistance in polyurethane foams; however, few such modified polyurethane foams meet the 25 flame spread test of ASTM E-84 Tunnel evaluations, i.e., a flame spread of 25 or less. Small amounts of commonly used filler materials have been employed in foams for thermal stability; see U.S. Pat. No. 3,640,920.

Flame retardant polyurethane foams now have been discovered which meet the 25 flame spread test of ASTM E-84 Tunnel evaluations. Such flame resistance is achieved by a combination of at least three polyols. Control of internal exotherm is achieved by the addition to the foams of an inorganic material such as hydrated alumina.

Accordingly, an object of this invention is to provide flame-resistant polyurethane foams.

Other objects, aspects, and advantages of this invention will be apparent to one skilled in the art from the following disclosure and appended claims.

The polyol employed in this invention is a mixture of at least three polyols.

One of the components of the unique mixture is an oxyalkylated, resole-based polyol. The polyol is formed by reacting an alkylene oxide with a resole formed by the reaction, under basic conditions, of phenol and formaldehyde. Generally, the ratio of components is 2.4 to 2.8 moles of formaldehyde per mole of phenol. The resole has a structure comprising, by weight, 40 to 70% trimethyol phenol and dimeric resole; 15 to 30% dimethyol phenol and trimeric resole polymers; 5 to 10% monomethyol phenol and tetrameric and larger resole polymers; and 1% or less free phenol. Typically, the alkylene oxide is propylene oxide, ethylene oxide, butylene oxide, and the like and mixtures thereof.

A second component of the polyol mixture of this invention is an ester-containing polyol. This polyol generally has an OH number ranging from 280 to 320. This ester-containing polyol often is a tetrabromophthalic anhydride based polyol.

The third polyol component is bis (2-hydroxyethyl) aminomethyhphosphonate.

The amount of each component in the polyol mixture is as follows:

| Material | Parts by Weight | |
|---|---|---|
| | Generally | Preferred |
| Oxyalkylated, resole-based polyol | 20 to 45 | 28 to 38 |
| Ester-containing polyol | 10 to 35 | 18 to 28 |
| Bis (2-hydroxyethyl) aminomethyhphosphonate | 2 to 15 | 4 to 10 |

Other polyols can be present in the polyol mixture of this invention.

The additive materials of this invention are inorganic materials such as hydrated alumina. Other inorganic materials that can be employed in this invention include hydrated tin oxides, poly ammonium phosphate, potassium fluororate, zinc oxide, silicon oxide, and the like and mixtures thereof.

The particle size of the additive materials of this invention can vary widely. Generally, the additive materials of this invention pass through 31a 325 mesh Tyler Standard Screen.

The amount of inorganic materials in the polyurethane foams of this invention, by weight, ranges from 0.5 to 12%, preferably 2 to 8%.

Urethanes or polyurethanes can be formed by a variety of methods, although the most widely used production method is the reaction of di- or polyfunctional hydroxyl compounds, for example, hydroxylterminated polyesters or polyethers, with di- or polyfunctional isocyanates. The general structure of a linear polyurethane derived from a dihydroxy compound, HOROH, and a diisocyanate, OCNR'NCO, can be represented by the following general formula:

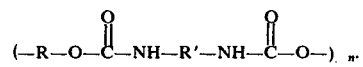

Suitable isocyanates or reactive -NCO containing compounds which may be employed in practicing the invention include: 2,4-tolylene disocyanate; 2,6-tolylene disocyanate; p-phenylene diisocyanate; polymethylene polyphenylisocyanate; diphenyl-methane diisocyanate; m-phenylene disocyanate; hexamethylene disocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; 2,4-diisocyanate, 3,3'-dimethyl-4,4'-biphenylene diisocyanate; 1-methoxy phenylene-2,4-diisocyanate; diphenylene-4,4'diisocyanate, 4,4'-diisocyanate diphenyl ether; naphthylene-1,5-diisocyanate; diisocyanate-diclyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3-methyl-4,6,4'-triisocyanate diphenyl methane; 2,4,4'-triisocyanate diphenyl; 2,4,4'-triisocyanate diphenyl ether; long chain hydrocarbons and substituted hydrocarbons terminated with —NCO radicals and mixtures thereof. Prepolymers having reactive isocyanate or —NCO groups may also be used.

Other polyols (hydroxy terminated or polyhydric compounds) which may be reacted with the isocyanate containing compounds include by way of example: polyalkylene ether glycols, triols and so forth having up to eight hydroxyl groups, and the polyhydric polyesters obtained by the reaction of a dicarboxylic acid with one or more polyhydric alcohols such as diol, triol, tetrol to produce a hydroxy terminated polyester. Examples of polyhydric compounds include branched chain polyols of hydroxyl terminated condensation products of propylene oxide or of mixed ethylene and propylene oxides or other alkylene oxides with polyhydric alcohols of two to eight hydroxyl groups such as with ethylene glycol, glycerol, 1,3,6-hexanetriol, pentaerythritol, sorbitol, sucrose, and methyl glucoside, or with diamines, and triamines; linear polyols such as dipropylene glycol, tripropylene glycol, polypropylene ether glycol, polyisopropylene ether glycol, polyethylene propylene ether glycol, polyethylene ether glycol, polyhexamethylene ether glycol, polytetramethylene ether glycol and liquid hydroxy terminated polyesters formed by reaction of a dicarboxylic acid such as adipic or sebacic acid or their anhydrides with one or more of the above glycols or with a small amount of a higher polyol, e.g. hexanetriol, or pentaerythritol to give some branching. Small amounts of amines or amino alcohols can also be used in making polyesters.

Rigid, low density polyurethane foams can be prepared by reacting the polyols of this invention with the polyisocyanates in the presence of a suitable catalyst, a blowing agent, and generally a surfactant. This invention works well for both the one-shot technique and the pre-polymer approach.

The amount of polyisocyanate used will vary slightly but preferably the total —NCO equivalent to total polyol active hydrogen equivalent should be greater than one. Generally, the NCO/OH index ranges from 1/1 to 5/4.

The foaming operation is effected by means of incorporating the blowing agent in the foam forming constituents. It can be water or a low boiling, inert liquid, which vaporizes below the temperature of the foaming mass. The preferred blowing agents are certain halogen-substituted aliphatic hydrocarbons. In rigid foams intended for use as insulation the incorporation of a gas lowers the foam's heat conductivity and results in obtaining a better K-factor. All of these methods are known in the art.

Preferred blowing agents are fluorocarbons such as trichloromonofluoromethane, dichlorofluoromethane, and the like. The weight of blowing agents used is varied depending on the foam density desired.

Catalysts are commonly used to increase the rate of the isocyanate-polyol reaction. A wide variety of compounds can be used. Tertiary amines are commonly used for this purpose. Triethylenediamine is preferably used in practicing this invention. Other commonly employed catalysts are triethyleamine and dimethylethanolamine, as well as tin, lead, and cobalt containing compounds.

When producing urethane foams it is useful in many cases to use a surfactant which serves to regulate rigid foam cell size. The surfactant most frequently used are high molecular weight, liquid silicones. The weight of surfactant used is generally between 0.5% and 1.5% by weight of the polyol.

The polyurethane foam buns of this invention generally are 1 to 3 inches in thickness; however, the thickness can be greater than 3 inches, if desired. Hydrated alumina especially in useful in large buns to control exotherm (internal heat). The size of the bun can be varied as long as the exotherm does not exceed the temperature at which the bun will decompose.

The inorganic materials of this invention generally are added to the polyol component prior to the foaming operation. The amount of inorganic material in the polyol, by weight, ranges from 0.5 to 20%, preferably 5 to 15%. If desired, the inorganic material can be added to the isocyanate rather than the polyol.

The modified polyurethane foams of this invention meet the 25 flame spread test of ASTM E-84 Tunnel evaluations. Naturally, due to process and testing limitations, a mavrick sample with a flame spread of about 27 or 28 is considered to have met the 25 flame spread test, e.g., the material is considered to be flame spread 25 if three samples from the same run give flame spreads of 25, 28, and 25.

The advantages of this invention further are illustrated by the following examples. The reactants, proportions, and other specific conditions are presented as being typical and should not be construed to limit the invention unduly.

EXAMPLE I

| Ingredients | Parts by Weight |
|---|---|
| Isocyanate - polyphenyl polymethlene polyisocyanate | 81.20 |
| Polyol-tetrabromophthalic anhydride based polyol | 22.20 |
| Polyol-bis (2-hydroxyethyl) aminomethylphosphonate | 6.39 |
| Polyol-oxyalkylated, resole based polyol | 32.35 |
| Polyol-propoxylated diethylene triamine | 4.44 |
| Water | 0.67 |
| Blowing agent - trichlorofluoromethane | 18.00 |
| Catalyst - triethylenediamine in dipropylene glycol | 0.58 |
| Surfactant - silicone glycol copolymers with direct silicone carbon bonds | 0.71 |
| Flame retardant - phosphorous, chlorine containing additive | 4.66 |

The NCO/OH index is 1.18.

The sample was prepared by the one-shot method comprising adding the surfactant, flame retardant, and inorganic material to the polyols. The blowing agent then was added followed by the water and catalyst. The run was completed by adding the isocyanate, mixing, dispensing the mixture onto a moving conveyor, and allowing the foam to rise into a continuous bun. Each sample was cured 3 days at ambient temperatures. Samples having a thickness of 1 inch and 3 inches were tested in ASTM E-84 Tunnel evaluations. Flame spread values for various thicknesses and batches of the above sample ranged from 19 to 27. Most of the samples had flame spread values in the range of 23 to 25. Visual examination of the samples revealed no cracking.

The tetrabromophthalic anhydride based polyol we employed in this example and the following examples was prepared from 464 parts of tetrabromophthalic anhydride, one part of tri-n-butylamine, and 400 parts of a condensation product of propylene oxide and pentaery-thritol (hydroxyl number 556). Example VII of U.S. Pat. No. 3,585,185 describes one process for producing this polyol.

The phosphorus, chlorine flame retardant we employed in this example and the following examples is represented by the formula

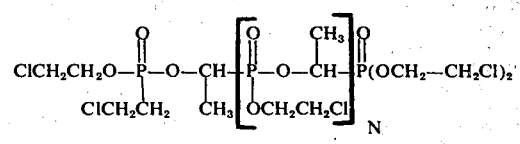

and has a chlorine content of 27 weight percent and a phosphorus content of 15 weight percent. Monsanto produces this material under the tradename Phosgard C-22-R.

The surfactant we employed in this example and the following examples is Dow Corning's 193 Surfactant.

The surfactant is the combination of dimethyl silicone and an adduct of ethylene oxide and propylene oxide where the adduct is hydroxyl terminated.

The NCO content available in the polyphenol polymethylene polyisocyanate we used in these examples is 32 weight percent.

The diethylene triamine we employed was propoxylated until it reached a hydroxyl number of 700. We used 1 mole of diethylene triamine and 5 moles of propylene oxide.

EXAMPLE II

A run was carried out according to the procedures of Example I except that an isocyanate prepolymer was employed. The prepolymer contained about 5% polyol. Ingredients and amounts were as follows:

| Ingredients | Part by Weight |
| --- | --- |
| Prepolymer-polyphenyl polymethylene polyisocyanate and tetrabromophthalic anhydride based polyol | 82.30 |
| Polyol-oxyalkylated, resole based polyol | 32.61 |
| Polyol-tetrabromophthalic anhydride based polyol | 20.54 |
| Polyol-propoxylated diethylene triamine | 4.60 |
| Polyol-bis (2-hydroxyethyl) aminomethylphosphonate | 6.62 |
| Flame retardant-phosphorus, chlorine containing additive | 4.83 |
| Water | 0.69 |
| Surfactant-silicone glycol copolymers with direct silicone carbon bonds | 0.50 |
| Catalyst-triethylenediamine in dipropylene glycol | 0.60 |
| Blowing agent - trichlorofluoromethane | 18.65 |
| Inorganic material-hydrated alumina | 10.36 |
| NCO/OH index | 1.10 |
| ASTM E-84 flame spread | 23.00 |

Visual examination of the sample revealed no cracking.

EXAMPLE III

A run was carried out according to the procedures of Example I except that no hydrated alumina was employed. Foam buns were prepared 2 ft. × 4 ft. × 1.5 ft. Ingredients and amounts were as follows:

| Ingredients | Parts by Weight |
| --- | --- |
| Isocyanate - polyphenyl polymethylene polyisocyanate | 81.20 |
| Polyol - tetrabromophthalic anhydride based polyol | 24.50 |
| Polyol - bis (2-hydroxyethyl) aminomethylphosphonate | 7.00 |
| Polyol-oxyalkylated, resole based polyol | 36.50 |
| Polyol-propoxylated diethylene triamine | 5.00 |
| Water | 0.75 |
| Blowing agent - trichlorofluoromethane | 19.65 |
| Catalyst - triethylenediamine | 0.80 |
| Flame retardant - phosphorous, chlorine containing additive | 5.00 |
| Surfactant - silicone glycol copolymers with direct silicone carbon bonds | 0.8 |
| NCO/OH index | 1.10 |
| ASTM E-84 flame spread | 25. |

Visual examination of the sample revealed no cracking.

EXAMPLE IV

Runs were carried out according to the procedures, ingredients, and amounts of Example III, except that the size of the bun was very large, i.e., the cross-sections were greater than 2 ft. × 1.5 ft. and the length of the bun was continuous with the conveyor. Visual examination of the buns revealed cracking, which generally is caused by excessive internal exotherm.

Although this invention has been described in considerable detail, it must be understood that such detail is for the purposes of illustration only and that many variations and modifications can be made by one skilled in the art without departing from the scope and spirit thereof.

We claim:

1. A polyol composition of at least 3 polyols comprising the following materials in parts by weight:

| | |
| --- | --- |
| oxyalkylated, resole-based polyol | 20 to 45 |
| ester-containing polyol | 10 to 35 |
| bis (2-hydroxyethyl) aminomethylphosphonate | 2 to 15 | wherein the oxyalkylated, resole-based polyol is a reaction product of an alkylene oxide and a resole formed, under basic conditions, of 2.4 to 2.8 moles of formaldehyde and 1 mole of phenol and the ester containing polyol is a tetrabromophthalic anhydride based polyol prepared from tetrabromophthalic anhydride and a condensation product of propylene oxide and pentaery-thritol.

2. A polyol composition according to claim 1 wherein the parts by weight of each of the materials is:

| | |
| --- | --- |
| oxyalkylated, resole-based polyol | 28 to 38 |
| ester-containing polyol | 18 to 28 |
| bis (2-hydroxyethyl) aminomethylphosphonate | 4 to 10. |

3. A polyol composition according to claim 1 wherein the ester containing polyol is prepared from 464 parts of tetrabromophthalic anhydride, one part of tri-n-butylamine, and 400 parts of a condensation product of propylene oxide and pentaery-thritol.

4. A rigid, low density polyurethane foam composition having a flame spread index less than 25 in an ASTM E-84 Tunnel test formed by reacting one or more compounds having reactive —NCO groups with one or more polyols having reactive —OH groups in the presence of a catalyst, surfactant, fire retardant, and blowing agent, in an NCO/OH index ranging from 1/1 to 5/4; wherein the polyols are a mixture of at least 3 polyols comprising the following materials in part by weight:

| | |
| --- | --- |
| oxyalkylated, resole-based polyol | 20 to 45 |
| ester-containing polyol | 10 to 35 |
| bis (2-hydroxyethyl) aminomethylphosphonate | 2 to 15 | wherein the oxyalkylated resole-based polyol is a reaction product of an alkylene oxide and a resole formed, under basic conditions, of 2.4 to 2.8 moles of formaldehyde and 1 mole of phenol and wherein the ester containing polyol is a tetrabromophthalic anhydride based polyol prepared from tetrabromophthalic anhydride and a condensation product of propylene oxide and pentaery-thritol.

5. A composition according to claim 4 wherein the parts, by weight, of each of the polyol materials is:

| | |
|---|---|
| oxyalkylated, resole-based polyol | 28 to 38 |
| ester-containing polyol | 18 to 28 |
| bis (2-hydroxyethyl) aminomethylphosphonate | 4 to 10. |

6. A composition according to claim 4 wherein the ester containing polyol is prepared from 464 parts of tetrabromophthalic anhydride, one part of tri-n-butylamine, and 400 parts of a condensation product of propylene oxide and pentaery-thritol.

7. A composition according to claim 4 wherein NCO-/OH index is greater than 1/1.

* * * * *